United States Patent [19]
Hay

[11] 3,789,106
[45] Jan. 29, 1974

[54] PROCESS FOR PURIFYING GAS MIXTURES CONTAINING PARTICULARLY CO AS IMPURITY

[75] Inventor: Léon Hay, Paris, France

[73] Assignee: L'Air Liquide, Societe Anonyme pour l'Getude et l'Exploitation des Procedes, Georges Claude, Paris, France

[22] Filed: June 16, 1971

[21] Appl. No.: 153,798

[30] Foreign Application Priority Data

June 23, 1970 France .............................. 70.23107

[52] U.S. Cl. .............. 423/247, 423/648, 252/455 Z
[51] Int. Cl. ............................................. B01d 53/34
[58] Field of Search.... 23/2 E, 25, 4, 204 M; 55/68, 55/75; 423/247, 648; 252/455 Z

[56] References Cited
UNITED STATES PATENTS

| | | |
|---|---|---|
| 3,013,985 | 12/1961 | Breck et al. ..................... 252/455 Z |
| 3,497,462 | 2/1970 | Kruerke .......................... 252/455 Z |
| 3,177,152 | 4/1965 | Kearby ............................. 23/2 E X |
| 3,346,328 | 10/1967 | Sergeys et al. ...................... 23/2 E |
| 3,476,508 | 11/1969 | Kearby et al. ....................... 23/2 E |
| 3,185,540 | 5/1965 | Breck et al. ......................... 23/2 S |

*Primary Examiner*—Earl C. Thomas
*Attorney, Agent, or Firm*—Browdy & Neimark

[57] ABSTRACT

The present invention has for its object a process by which traces of carbon oxide contained in a gas mixture of which the CO partial pressure is low are eliminated by adsorption, by the said mixture being brought into contact with a purifying mass formed of mordenite charged with copper.

The present invention has for its object an improved process for purifying gas mixtures which contain particularly the carbon oxide CO as impurity.

2 Claims, No Drawings

PROCESS FOR PURIFYING GAS MIXTURES CONTAINING PARTICULARLY CO AS IMPURITY

The present invention relates to an improved process for purifying gas mixtures containing particularly the carbon oxide CO as impurity, even in extremely small proportions corresponding to reduced partial pressures. It is also concerned with any installation for carrying out this process and any adsorbent mass permitting this purifying process to be effected.

The industrial purification of gases by removing carbon oxide cannot in most cases be carried out economically by adsorption on the conventional adsorbents: carbons, silica gels, aluminium oxides or molecular sieves. It is in fact only possible to purify by adsorption in an interesting manner a gas mixture containing CO as impurity if the other constituents of the mixture are less adsorbable than the CO, the separation factor between main constituent and CO is high and, under low partial pressures, considerable quantities of CO are fixed by adsorption. At ambient temperature, in fact, all the foregoing conditions are not achieved for practically any gas.

It is however known from U.S. Pat. No. 3,185,540 that small quantities of oxygen and carbon oxide can be removed from a gas mixture by adsorption on a zeolite charged with iron, cobalt or nickel, reduced to the metallic state.

The research which has led to the present invention has produced the surprising and completely unforeseeable discovery that it was possible, with the aid of certain molecular sieves, to obtain the elimination of the carbonic gas CO contained in a gas mixture, and that this is achieved at less cost, without considerable investments or stoppages, without rapid degradation of the adsorption masses being used and without requiring preliminary treatment of these said masses or particular precautions, the said elimination being practically complete, even in the case where the partial pressures of CO are extremely small.

The present invention has for its object a process for eliminating, by adsorption, traces of carbon monoxide contained in a gas mixture, it being possible for the partial pressure of the carbon monoxide in the said mixture to be below 3 mm. Hg, in which this mixture is brought into contact with a purifying mass formed of mordenite charged with copper in the ionic or metallic form.

According to another embodiment of the invention, the mordenite is a natural, artificial or synthetic mordenite.

According to one embodiment of the invention, the contact between the gas mixture and the purifying mass occurs at ambient temperature.

According to another embodiment of the invention, the purifying mass charged with metallic copper is obtained by reduction of a mass charged with ionic copper.

The invention also has for its object any installation for carrying out the aforementioned purifying process.

The invention also has for its object the purifying masses which are formed of molecular sieves charged with copper in the ionic or metallic form.

The invention also relates to the gaseous mixtures purified from their CO content, it being possible for the said gaseous mixtures to contain at least one of the gases such as hydrogen, nitrogen, methane, oxygen and rare gases.

Other objects and advantages of the present invention will become apparent from reading the following description and from the examples and tables which are given in non-limiting manner.

The experimental arrangement (not shown) is formed of one or more column elements in series, the columns having a diameter of 6 mm or 12 mm for a fine grain size or a normal grain size (3 mm), respectively.

The mixture to be purified, of constant content, is caused to circulate on the adsorbent at a pressure and rate of flow which are kept constant, and at ambient temperature. Between each column element, an analysis sample permits the development of this content at this point during the purification to be followed. The saturation rates and the lengths of front in stationary operation are determined from the content curves obtained at these different points.

The purifying masses are prepared by known processes. One method of preparation consists, for example, in inserting a metal of a metallic salt into a zeolite, replacing the sodium ions of the basic zeolite. The mass can possibly be reduced to the metallic state by hydrogenation at elevated temperature.

EXAMPLES 1 to 5.

Example 1 was carried out by passing the gas mixture over a sodium mordenite (0.5 to 0.63 mm) and serves for comparison purposes.

In Examples 2 to 5, the sodium ions have been respectively replaced by the Ni, Co, Fe and Cu ions.

The efficiency of the purification from CO was studied on samples of mordenite in which the metal ions replace the sodium ions, and each of the saturation rates found are given in the following Table I.

TABLE I

| | | Columns | | | | Purification from CO | | | |
|---|---|---|---|---|---|---|---|---|---|
| | | No. 1 | | No. 2 | | | | | |
| Examples | Adsorbent grain size | length cm | weight g | length cm | weight g | rate l/h at 20°C | content vpm | saturation rate cc/g | length of front (cm) |
| 1 | Na mordenite 0.5 to 0.63 mm | 28 | 6.7 | 28 | 6.7 | 125 | 120 | ~0.06 | ~40 |
| 2 | Ni mordenite 0.5 to 1.5 mm | 22 | 5.12 | | | 129 | 120 | 2.1 | >60 |
| 3 | Co mordenite 0.6 to 1.5 mm | 25 | 5.76 | 25 | 5.65 | 132.5 | 120 | 1.5 | ~50 |
| 4 | Fe mordenite 0.5 to 0.63 mm | 27 | 6.23 | 27 | 6.24 | 128 | 120 | 0.33 | ~60 |
| 5 | Cu mordenite 0.5 to 0.63 mm | 28 | 6.55 | 28 | 6.55 | 128 | 130 | ~15 | ~60 |

These examples 1 to 5 were carried out with a fine grain size between 0.5 and 0.63 mm. The columns which were used had a diameter of 6 mm.

The operating conditions, which remain substantially constant, are the following:
P = 0.7 bars effective
T = ambient (about 19°C)
circulation speed ≈ 80 cm/sec. i.e. rate of flow of about 120 l/h (at n.t.p.)
CO content = ≈ 120 vpm (volume per million)
previous regeneration by circulation of $N_2$, rate of flow 60 l/h at 400°C for 4 hours.

From the results set out in Table I, it is possible to confirm that:
the test elements charged with metals are all better in their efficiency in stopping CO than the uncharged test elements or basic mordenite;
the increasing order in the saturation rates is as follows:
mordenite with iron: 5 to 8 times higher than on Na mordenite
mordenite with cobalt: about 25 times higher than on Na mordenite
mordenite with nickel: about 35 times higher than on Na mordenite
mordenite with copper: about 250 times higher than on Na mordenite,
and hence the mordenite-copper combination leads to absolutely unexpected synergic effects.

The lengths of front vary from one test element to the other, but are included between 40 to 70 cm approximately. It is deceptive to wish to compare them with one another, from the results which are obtained, seeing that the grain size which is used, while being of small size, varies from one specimen to the other. Only the specimens containing sodium, iron and copper were carried out with a homogeneous and identical grain size, and it is found that the saturation rate of the copper mordenite is about 45 times higher than that of the iron mordenite, while the lengths of front are equivalent.

Examples 6, 7 and 8

The purifying effect using the best adsorbent, the copper mordenite, with its normal grain size, 3 mm, is investigated.

The copper mordenite is compared with the sodium mordenite of the same grain size (3 mm).

The diameter of the columns being used is 12 mm, and the lengths of the elements arranged in series are either 28 cm, or 104 cm.

The operating conditions are identical with those of the previous investigation:
P = 0.7 bars effective
T = ambient (about 19°C)
circulation speed: about 80 cm/sec, i.e. rate of flow = 500 l/h
CO content in the region of 110 vpm (between 100 and 125 vpm).

The regeneration temperatures from one test to the other vary from ambient temperature to about 300°C. The first regeneration, itself not carried to such a high degree as with the preceding investigation (400°C), did not exceed 320°C. Two gases were used for this regeneration, neutral gas, nitrogen and a reducing gas, hydrogen.

The results are set out in the following Table II. It contains, in respect of 3 mm copper mordenite and 3 mm sodium mordenite, the results of the purification of CO from a stream of hydrogen charged with CO for different regeneration tests.

It is confirmed from studying this table that:
the saturation rate obtained on the copper mordenite is about 200 to 300 times higher than on the sodium mordenite; a similar ratio was obtained when using the fine grain sizes;
the reduction with hydrogen is not necessary; high saturation rates are obtained by regeneration with nitrogen and are not improved to a practical degree after reduction with hydrogen.

If the incidences of the regeneration temperature on the adsorption characteristics are studied, it is established that the purifying tests after regeneration under nitrogen at 20, 50, 100, 150 and 200°C show a progression of the saturation rate as the temperature is raised. The CO is eliminated, starting from the circulation at ambient temperature, but it is necessary to use temperatures of the order of 250°C for obtaining a total CO desorption relatively quickly.

Example 9

The important separation factor obtained in this case

TABLE II

Purification from CO and $H_2$ on copper mordenite 3 mm; on sodium mordenite 3 mm
Regeneration tests

| Adsorbent and grain size | Example | gas | Previous regeneration | | | Purification of CO from $H_2$ | | |
|---|---|---|---|---|---|---|---|---|
| | | | T °C | flow rate l/h | time h | content of CO vpm | saturation rate cc/g | length of front (m) |
| Na mordenite 3 mm | 6 | $N_2$ | 350 | 250 | 6 | 100 | 0.032 | ~3.85 |
| Copper mordenite 3 mm | 7 | $N_2$ | 320 | 250 | 6 | 102.5 | 7.5 | ~2.5 |
| | 8 | $H_2$ | 320 | 250 | 5 | 117 | 8 to 8.7 | ~2.3 | concerning the purification of hydrogen arises from the fact that if the fixation of CO by the copper sieve is certainly better than the adsorption on sodium mordenite, this affinity reinforcement does not affect the hydrogen. For checking whether this effect is quite specific to CO, adsorption tests of different pure gases on copper mordenite and sodium mordenite were carried out.

Working on gases such as oxygen, nitrogen and methane, it was found that there is no reinforcement of affinity for these gases after changing the sodium ions for the copper ions, and this establishes very well the specific character of the adsorption of CO which is provided by the mordenite charged with copper.

What I claim is:
1. In a process for purifying hydrogen gases containing CO as carbon impurity by adsorbing said CO on a purifying mass and in which the partial pressure of said

CO in said hydrogen may be below 3 mm Hg. comprising bringing said impure hydrogen into contact with said purifying mass, the improvement wherein:

said purifying mass is mordenite charged with copper in the ionic form and wherein the contact between said impure hydrogen and the purifying mass takes place at room temperature.

2. A process according to claim 1, wherein said mordenite is selected from the group consisting of natural mordenite, artificial mordenite and synthetic mordenite.

* * * * *

UNITED STATES PATENT OFFICE
CERTIFICATE OF CORRECTION

Patent No. 3,789,106                    Dated January 29, 1974

Inventor(s) Leon Hay

It is certified that error appears in the above-identified patent and that said Letters Patent are hereby corrected as shown below:

On the title page, in item [73] "l'Getude" should read -- l'Etude --.

Signed and sealed this 5th day of November 1974.

(SEAL)
Attest:

McCOY M. GIBSON JR.
Attesting Officer

C. MARSHALL DANN
Commissioner of Patents